May 6, 1952   J. H. KEATING   2,595,361
COOKING UTENSIL
Filed May 24, 1949
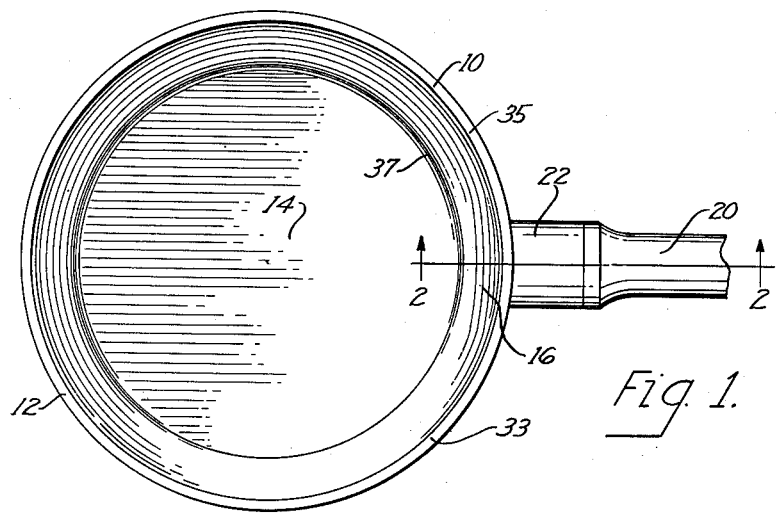
Fig. 1.
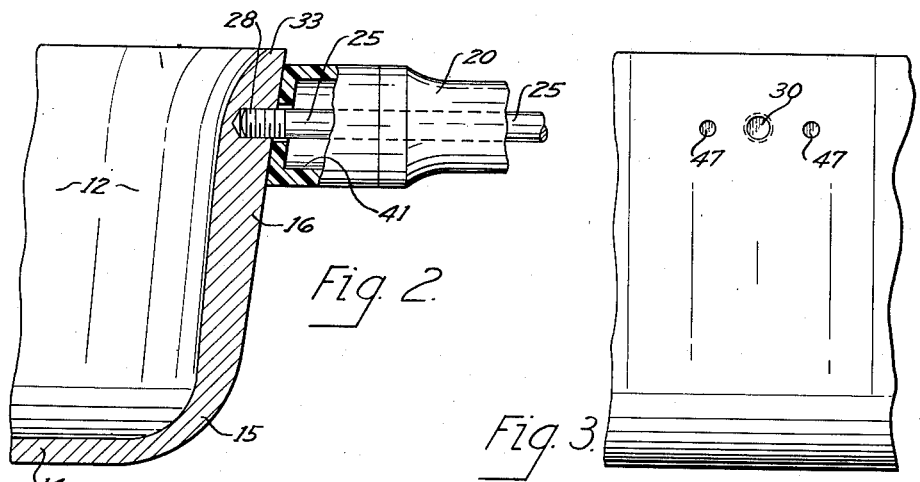
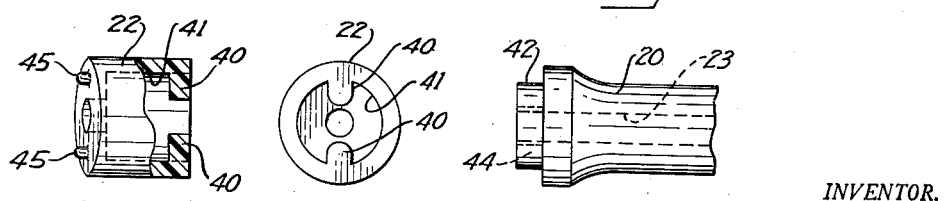
Fig. 4.   Fig. 5.   Fig. 6.
INVENTOR.
JOHN H. KEATING
BY
Bosworth & Sessions
ATTORNEYS.

Patented May 6, 1952

2,595,361

UNITED STATES PATENT OFFICE 2,595,361

COOKING UTENSIL

John H. Keating, Cleveland, Ohio, assignor to Monarch Aluminum Mfg. Company, Cleveland, Ohio, a corporation of Ohio Application May 24, 1949, Serial No. 95,046

3 Claims. (Cl. 220—94)

This invention relates to cooking utensils and more particularly to the manner in which handles are secured to the same.

In the manufacture of cooking utensils, particularly those made in the form of castings, an essential operation has been the polishing of the exterior side surface to provide a finished appearance that is essential in the final product. Heretofore it has been necessary in making such utensils to provide an outwardly extending boss on the upper side portion to which the handle of the utensils was affixed. The extending boss presented an obstacle to machine polishing the outer surface in that it was not possible to polish the entire surface due to the interference of the boss. In the region of the boss it was possible to polish only a part of the side surface by machine and it was necessary thereafter to hand polish the boss and pan surface immediately adjacent thereto, in as much as these surfaces could not be reached by the machine. The necessity of hand polishing resulted in a more expensive and less attractive final article than was desired. The operations of casting the boss and thereafter hand polishing it and the adjacent pan surface added a very appreciable item of expense to the finished product; also, hand polishing did not provide the same degree of finish that results from machine polishing and many finished utensils did not pass final inspection due to this difference in surface texture.

It is a general object of the present invention to provide a cooking utensil in which the foregoing objections are eliminated. Another object is to provide a cooking utensil to which a handle may readily be secured without the provision of a protruding boss. Still a further object of the invention is to provide a cast cooking utensil that may be machine polished over its entire exterior and interior surfaces.

Another object is to provide such a cooking utensil having a circular upper edge portion of substantially uniform width, so that a round lid or cover may be fitted thereon in any position. A further object is the provision of such a cooking utensil in which the juncture of the side and bottom is round so that food in the utensil can be stirred easily. Another object is the provision of such a cooking utensil which can be manufactured readily by permanent mold casting operations. Still a further object is to provide a cooking utensil of simple and rugged construction that is economical to manufacture with a minimum of hand operations.

Other objects of the invention will become apparent from the following specification and from the drawings while the novel features thereof are summarized in the claims.

Referring now to the drawings, Figure 1 is a plan view of a utensil embodying my invention showing the handle secured thereto; Figure 2 is a fragmentary section through Figure 1 as indicated by the lines 2—2 thereon; Figure 3 is a fragmentary side elevation of the utensil showing the place at which the handle is secured; Figure 4 is a detail, partly in section, showing a heat resistant bushing that is inserted between the pan and the wooden handle to prevent the latter from charring; Figure 5 is an end elevation of the bushing showing the surface that abuts the handle; Figure 6 is a fragmentary side elevation of the handle showing that portion which engages the bushing; and, Figure 7 shows the threaded rod by which the utensil, bushing and handle are secured together.

While the drawings and the following description are directed to a sauce pan that embodies the present invention it will be understood that the construction herein described is applicable to many other types of utensils, as for instance, frying pans and the like.

Referring now to the drawings and particularly to Figures 1 and 2 thereof, a cast aluminum sauce pan embodying the present invention is indicated at 10 and comprises the usual side wall 12 and bottom 14 merging at a curved portion 15. For reasons that will hereafter become apparent the side wall adjacent the handle is very appreciably thickened as at 16. It will be noted that, as shown in the drawing, the thickened portion 16 extends through only a small part of the circumference of the side wall. In all places except in the region of the handle the side wall, rounded portion 15 and bottom 14 are preferably of uniform thickness which thickness is indicated in Figure 2 insofar as the bottom 14 is concerned. The pan part of the utensil is preferably made as a permanent mold casting although it may be fabricated in other ways if desired. By reason of the elimination of the customary boss the initial forming of the pan is simplified and all of the surfaces of the pan can be rapidly and effectively polished by simple machine polishing operations.

A handle preferably made of heat insulating material is secured to the pan and may comprise a wooden handle 20 spaced from the pan by a heat resistant bushing 22 whose function is to prevent the inner end of the handle from making contact with the pan and thereby becoming charred when subjected to cooking heat over a considerable period of time. The handle 20 is of any conventional form that renders it easy to grip in the hand and is centrally bored as at 23 to receive a threaded rod 25 by which the handle is held in place as hereafter described. The rod 25 is formed at one end with an eye 27 which serves the dual purpose of providing an eye on which to hang the utensil and also provides a shoulder to prevent the handle from slipping off the end of the rod. The inner end of the rod is threaded as at 28 and engages complementary threads formed within a hole 30 of the pan in the region of the thickened wall portion 16. The thickened wall portion makes it possible to provide a hole of sufficient depth so the threads 28 of the rod can make proper and secure engagement with the pan.

The pan has been so designed that the thickened portion is not readily apparent to the user. It will be noted that the thickening of the wall is accomplished by making the radii of curvature of the inner surface greater in the thickened zone than in the remainder of the pan, the thickened portion merging smoothly with the adjacent wall portions so that the general appearance of the inner surfaces of the pan differs only slightly from that of a conventional cast pan with walls of uniform thickness. Thus the thickened portion is located intermediate the rim 33 of the pan and the bottom 14 so that the rim 33 is circular and of uniform width throughout as shown in Figure 1, thus making it possible to place a standard round lid or cover on the pan and have it fit in any position. The rounded portion 15 where it merges with the bottom 14 is also circular, so that when a user stirs material in the pan there is no feeling of a lack of concentricity nor an awareness of the existence of the thickened portion 16. Thus a feature of the invention lies in the fact that the thickened portion is so positioned and proportioned that it does not change the functioning of the pan in any way. Furthermore, as shown in Figure 2, there is a continuous flare from bottom to top of the pan even in the thickest portion; there are no undercut or recessed portions, thus a solid core can be removed from the casting and the pans can be cast in permanent molds.

The bushing 22 that is inserted between the pan and the handle 20 is formed as shown in Figures 2, 4 and 5. It is made of a suitable molded dielectric material that is highly heat resistant such as Bakelite or any of the other phenol-formaldehyde compounds, with or without suitable fillers, and is provided with a hollow bore to permit passage of the rod 25 as shown. At its outer end it is formed as shown in Figures 4 and 5 with two inwardly extending lugs 40 protruding radially from a cylindrical internal surface 41. The handle 20 in turn is formed with an annular extension 42 which is adapted to fit closely within the surface 41 and which is provided with recesses 44 that receive the lugs 40. Thus the handle has a tight fit with the bushing and at the same time is prevented from rotating with respect to the bushing when the parts are assembled.

The surface of the bushing which lies adjacent the pan is concavely curved in a manner corresponding to the external surface of the pan, to insure that the bushing and pan will fit closely together when assembled. Furthermore, to prevent relative rotation of the bushing with respect to the pan the concave surface of the bushing just described is provided with two lugs or pins 45 that extend into corresponding recesses 47 (Figure 3) in the pan thereby preventing rotation of the bushing with respect to the pan when the utensil is assembled.

To assemble the utensil after the pan has been formed and finished including external polishing, the bushing 22 is placed in position with the pins 45 within the recesses 47 with the hole 30 automatically aligned with respect to the corresponding bore in the bushing 22. The handle 20 is then put in place with the extension 42 fitting within the bushing 22 and the lugs 40 of the bushing fitting within the corresponding recesses 44 of the handle. The rod 25 is then inserted through the handle and through the bushing and the threaded portion 28 thereof is screwed into the tapered hole 30 of the pan. If desired, a more sturdy assembly may be provided by insertion of a metal washer within the end of the handle to make contact with the eye 27 of the rod 25 to prevent the rod from cutting into the wooden handle. Also, if desired, a small internally threaded bushing may be cast integrally within the thickened portion 16 of the pan for reception of the threaded end 28 of the rod 25 thus providing stronger threads than might be provided from material of which the pan is made. For example, a steel nut might be cast into an aluminum pan.

From the foregoing description it will be seen that I have provided a simplified, less expensive and more rugged cooking utensil with a handle assembly that is protected from the heat of the pan and that will not become loosened or rotate about its axis with respect to the pan. Furthermore I have provided a pan having smooth exterior and interior surfaces that may be continuously polished over its entire exterior and interior surfaces by rotation of the pan and a polishing tool with respect to each other about the axis of the pan; and while the thickened portion furnishes ample support for the handle, it does not complicate the manufacture of the pan, does not affect the pan, and does not substantially change its appearance.

While I have described a preferred form of my invention modifications and changes will occur to those skilled in the art without departing from my invention and my teachings herein, and it is to be understood that the foregoing description is given by way of example rather than limitation. The appended claims are intended to cover the patentable features of the invention.

I claim:

1. A cooking utensil comprising a generally round side wall and a bottom integrally joined thereto, the exterior and interior surfaces of said side wall being smoothly curved, said side wall having a thickened portion extending throughout only a portion of the circumference of said side wall and disposed above the bottom, the exterior and interior surfaces of the thickened portion being smoothly curved throughout, the interior surface of said thickened portion being concave in a horizontal plane and the exterior surface of said portion being convex in a horizontal plane, the smooth exterior surface of said thickened portion having a threaded opening therein, said opening stopping short of the interior surface of said side wall and being adapted to support a handle member, the inner surface of said side wall being generally circular adjacent the rim thereof and adjacent the juncture of the side wall and bottom.

2. A cooking utensil comprising a generally round side wall and a bottom integrally joined thereto, the exterior and interior surfaces of said side wall being smoothly curved said side wall having a thickened portion extending throughout only a portion of the circumference of said side wall and disposed above the bottom, the exterior and interior surfaces of the thickened portion being smoothly curved throughout, the interior surface of said thickened portion being concave in a horizontal plane and the exterior surface of said portion being convex in a horizontal plane, the smooth exterior surface of said thickened portion having a threaded opening therein, said opening stopping short of the interior surface of said side wall and being adapted to support a handle member, the inner surface of said side wall being generally circular adjacent the rim thereof and adjacent the juncture of the side wall and bottom, the radius of curvature of said concave portion being greater than the radius of curvature of the remaining portions in said horizontal plane to provide said side wall with said thickened portion.

3. A cooking utensil comprising a generally round side wall and a bottom integrally joined thereto, the exterior and interior surfaces of said side wall being smoothly curved, said side wall having a thickened portion extending throughout only a portion of the circumference of said side wall and disposed above the bottom, the exterior and interior surfaces of the thickened portion being smoothly curved throughout, the interior surface of said thickened portion being concave in a horizontal plane and the exterior surface of said portion being convex in a horizontal plane, the smooth exterior surface of said thickened portion having a threaded opening therein, said opening stopping short of the interior surface of said side wall and being adapted to support a handle member, the inner surface of said side wall being generally circular adjacent the rim thereof and adjacent the juncture of the side wall and bottom, the radius of curvature of said concave portion being greater than the radius of curvature of the remaining portions in said horizontal plane to provide said side wall with said thickened portion, a handle member having a surface substantially conforming to the exterior surface adjacent said opening, and a screw engaging said opening and securing said handle to said side wall.

JOHN H. KEATING.

REFERENCES CITED

The following references are of record in the file of this patent:

UNITED STATES PATENTS

| Number | Name | Date |
| --- | --- | --- |
| D. 142,041 | Shaeffer | Aug. 14, 1945 |
| 166,364 | Hartwell | Aug. 3, 1875 |
| 238,420 | Mishler | Mar. 1, 1881 |
| 397,098 | Torrance | Jan. 29, 1889 |
| 482,630 | Fowler | Sept. 13, 1892 |
| 603,857 | Perotte | May 10, 1898 |
| 904,417 | Fowles | Nov. 17, 1908 |
| 1,153,575 | Rawley | Sept. 14, 1915 |
| 1,316,623 | Logan | Sept. 23, 1919 |
| 1,550,618 | Kemp | Aug. 18, 1925 |
| 1,606,833 | Grover | Nov. 16, 1926 |
| 1,742,914 | Holden | Jan. 7, 1930 |
| 2,317,349 | Wolfers | Apr. 27, 1943 |
| 2,442,454 | Bodell | June 1, 1948 |
| 2,522,579 | LeRette | Sept. 19, 1950 |

FOREIGN PATENTS

| Number | Country | Date |
| --- | --- | --- |
| 640,371 | France | Mar. 26, 1928 |